United States Patent Office 3,745,068
Patented July 10, 1973

3,745,068
PROCESS OF PREVENTING NITRIDATION OF STEEL SUBMERGED IN LIQUID SODIUM
Albert K. Fischer, Western Springs, Ill., assignor to the United States of America as represented by the United States Atomic Energy Commission
No Drawing. Filed Sept. 21, 1971, Ser. No. 182,518
Int. Cl. B01j 1/16; G21c 9/00
U.S. Cl. 176—38                                                 8 Claims

ABSTRACT OF THE DISCLOSURE

A process of preventing nitridation of steel submerged in liquid sodium, especially the stainless steel components of nuclear reactors which are submerged in liquid sodium coolant, which comprises adding an effective amount of calcium or magnesium to the liquid sodium for reacting with nitrogen carriers present in the sodium or with the sodium impurities which form such carriers whereby nitrogen is prevented from being carried to the stainless steel.

CONTRACTURAL ORIGIN OF THE INVENTION

The invention described herein was made in the course of, or under, a contract with the United States Atomic Energy Commission.

BACKGROUND OF THE INVENTION

There is a serious problem of embrittlement of the stainless steel components of liquid-sodium-cooled nuclear reactors due to the nitridation of the steel in contact with the sodium. This problem also exists to a less important extent for any steel containers used to store liquid sodium.

Prior to this invention, so far as is known, the prevention of nitridation of steel in contact with liquid sodium has not been accomplished.

An object of this invention is to prevent or substantially inhibit the nitridation of steel in contact with liquid sodium.

SUMMARY OF THE INVENTION

It has been found that steel in contact with liquid sodium which contains the normal impurities present in commercial sodium will undergo nitridation with consequent embirttlement and other defects deleterious to its use as a component in sodium-cooled nuclear reactors and as containers for sodium. Some impurities which appear to be substantial contributors to the nitridation are cyanides—most likely present as sodium cyanide—phosphorus and carbon. These impurities, among others, either act as nitrogen carriers, which contain nitrogen as in the case of the cyanides, or form such nitrogen carriers as with carbon and phosphorus. Such nitrogen carriers convey nitrogen to the stainless steel, the nitrogen subsequently reacting with the steel to form nitrides.

I have discovered that the addition of calcium or magnesium to the liquid sodium in which the steel is submerged will prevent the nitridation of the steel.

While I do not wish to be restricted to any theory of the mechanism involved, it is believed that nitrogen from the air or from a nitrogen atmosphere is absorbed by the liquid sodium and reacts with impurities such as carbon and phosphorus in the sodium to form nitrogen carriers such as cyanides which on contact with steel result in nitridation of the steel. The calcium and magnesium react with these carriers, which contain nitrogen or with the impurities which form such carriers and thereby prevent the nitrogen from being carried to and subsequently nitriding the steel. Examples of compounds which may form as a result of the addition of calcium to the liquid sodium are $Ca_3N_2$, $CaCN_2$ and $Ca(CN)_2$.

DETAILED DESCRIPTION OF THE INVENTION

In accordance with a preferred embodiment of this invention, approximately 1.0 atomic percent of calcium or magnesium is added to liquid sodium having among its impurities cyanide, carbon and phosphorus. Stainless steel sheets or other steel articles submerged in said liquid sodium are thereby prevented from being nitrided. The concentration of the calcium or magnesium is preferably maintained at the 1.0 atomic percent level as long as the steel remains submerged in the sodium.

The concentration of the calcium or magnesium to obtain inhibition of nitriding may suitably be as high as the solubility limits of these two elements in liquid sodium and as low as any concentration which effectively prevents nitridation. An example of such a maximum limit for calcium is about 3.0 atomic percent in 600° C. sodium, while a similar limit for magnesium is about 1.0 atomic percent. The lowest concentration effective in inhibiting nitridation cannot be specifically defined in that such concentration is dependent upon the type and concentration of impurities present in any specific sodium sample.

Cyanide may be present in 2 parts per million or higher, but ordinarily would not run higher than 100 parts per million, and generally is normally present in about 10 parts per million in the sodium. The carbon may be present in 2 parts per million or higher, but does not ordinarily run higher than 0.2 percent by weight and generally is present in the sodium in about 10 parts per million.

The sodium may contain other impurities such as phosphorus, arsenic and zirconium, generally present in less than 500 parts per million for each, but may be present in higher amounts. The addition of calcium or magnesium to sodium containing such impurities also results in prevention of nitridation. The phosphorus is also involved in nitrogen carrier formation and is present in commercial sodium, and also may be introduced into the sodium by leaching from phosphorus-containing steel that is in contact with the sodium.

A typical analysis of sodium impurities is as follows:

| Element | P.p.m. | Element | P.p.m. | Element | P.p.m. | Element | P.p.m. |
|---|---|---|---|---|---|---|---|
| Ag | <0.3 | Cd | <3 | Li | <0.5 | Si | 20 |
| Al | 3 | Co | <15 | Mg | 4 | Sn | <15 |
| As | <500 | Cr | <3 | Mn | <0.3 | Sr | <15 |
| Au | <5 | Cu | <3 | Mo | <3 | Ti | <3 |
| B | <25 | Fe | <3 | Ni | <5 | V | <15 |
| Ba | <50 | Ga | <3 | P | <250 | Zn | <150 |
| Be | <0.3 | Hg | <50 | Pb | <3 | Zr | <250 |
| Bi | <8 | In | <3 | Pd | <15 | | |
| C | 10 | Ir | <150 | Rb | <25 | | |
| Ca | <15 | K | 200 | Sb | <50 | | |

Also, oxygen may be present in the sodium and the calcium or magnesium will act as a getter for the oxygen while also preventing or inhibiting nitridation of the steel.

The following examples are given to illustrate the invention:

EXAMPLE I 0.40 gram of calcium was added to 22.8 grams of liquid sodium in a container inert to sodium at a temperature of 590° C. The sodium contained 10 p.p.m. carbon and 200 p.p.m. of phosphorus. A sheet of stainless steel No. 304 analyzing 365 p.p.m. nitrogen was submerged in the hot sodium for 240 hours. The sheet was then removed, analyzed and found to contain 360 p.p.m. nitrogen.

EXAMPLE II

The procedure of Example I was repeated with the same materials except that no addition of any kind was made to the sodium. The sheet on removal from the sodium was found to contain 1800 p.p.m. nitrogen as the nitride. It was also observed that when calcium was not added to the sodium, 244 p.p.m. cyanide were present in the sodium after the 240 hours. This was in contrast to only 7.3 p.p.m. cyanide present when the calcium was added in Example I, indicating thereby that the cyanide was reacting with and being removed by the calcium.

The addition of magnesium to liquid sodium containing the usual impurities as outlined above give substantially the same results of preventing nitridation of steel submerged in it as the addition of calcium. For example, if 0.24 gram of magnesium is added to 22.8 grams of liquid sodium under circumstances similar to Example I, essentially the same results are obtained. If this magnesium is omitted from the procedure as was calcium in Example II, the steel upon removal from the sodium is highly nitrided.

Ordinary steels and all types of alloy steels are prevented from nitriding in liquid sodium by the addition of calcium or magnesium to the liquid sodium.

It will be understood that the invention is not to be limited to the details given herein but that it may be modified within the scope of the appended claims.

The embodiments of the invention in which an exclusive property or privilege is claimed are defined as follows:

1. A process of preventing nitridation of steel submerged in liquid sodium containing nitrogen carriers which contain nitrogen and impurities which form said nitrogen carriers, said impurities including nitrogen, that are reactive with calcium or magnesium which comprises adding to said sodium an effective amount of calcium or magnesium to react with said carriers and said carrier-forming impurities to prevent reactive nitrogen from being carried to said steel submerged in said liquid sodium, thereby preventing nitridation of said steel.

2. A process according to claim 1 wherein approximately 1.0 atomic percent calcium is added to the sodium.

3. A process of preventing nitridation of steel submerged in liquid sodium having carbon, cyanide, phosphorus and mixtures thereof as impurities, which comprises adding to said sodium an effective amount of calcium or magnesium.

4. A process according to claim 3 in which said impurities are present in the sodium in less than 500 parts per million and approximately 1.0 atomic percent calcium or magnesium is added to the sodium.

5. A process according to claim 3 in which approximately 1.0 atomic percent calcium is added to the sodium.

6. A process according to claim 3 in which the steel is in the form of stainless steel components of a liquid-sodium-cooled nuclear reactor and the liquid sodium is the coolant of said reactor.

7. A process according to claim 6 in which the reactor is in operation and the calcium concentration is maintained at about 1.0 atomic percent of the sodium during operation of the reactor.

8. A process according to claim 1 in which the nitrogen carrier and nitrogen-carrier-forming impurities are carbon, cyanides, phosphorus and mixtures thereof.

References Cited

UNITED STATES PATENTS

| | | | |
|---|---|---|---|
| 2,943,034 | 6/1960 | Mausteller | 176—38 |
| 3,243,280 | 3/1966 | Bohlmann et al. | 176—92 B |

OTHER REFERENCES

Ames Lab.: "Annual Summary Research Report in Engineering for July 1, 1959–June 30, 1960," Nuclear Science Abs., vol. 15, No. 5854.

Theron L. Mackay: "Calcium Nitride in Sodium," Nuclear Science Abs., vol. 15, September 1961, No. 22,651.

CARL D. QUARFORTH, Primary Examiner

E. E. LEHMANN, Assistant Examiner

U.S. Cl. X.R.

176—92 R; 252—387, 397